(12) United States Patent
Park et al.

(10) Patent No.: US 9,219,994 B2
(45) Date of Patent: Dec. 22, 2015

(54) METHODS FOR TRANSMITTING AND RECEIVING DOWNLINK DATA IN MBSFN SUBFRAME AND APPARATUSES THEREOF

(71) Applicant: LG ELECTRONICS INC., Seoul (KR)

(72) Inventors: Hanjun Park, Anyang-si (KR); Seungmin Lee, Anyang-si (KR); Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 539 days.

(21) Appl. No.: 13/673,510

(22) Filed: Nov. 9, 2012

(65) Prior Publication Data

US 2013/0114498 A1 May 9, 2013

Related U.S. Application Data

(60) Provisional application No. 61/577,882, filed on Nov. 9, 2011, provisional application No. 61/559,681, filed on Nov. 14, 2011.

(51) Int. Cl.
| | | |
|---|---|---|
| H04B 7/185 | (2006.01) | |
| H04W 4/06 | (2009.01) | |
| H04W 52/14 | (2009.01) | |
| H04W 52/04 | (2009.01) | |

(52) U.S. Cl.
CPC ............... *H04W 4/06* (2013.01); *H04W 52/04* (2013.01); *H04W 52/143* (2013.01); *Y02B 60/50* (2013.01)

(58) Field of Classification Search
CPC . H04W 24/10; H04W 84/045; H04W 72/082; H04L 25/0202; H04L 27/2636
See application file for complete search history.

(56) References Cited

U.S. PATENT DOCUMENTS

| | | | | |
|---|---|---|---|---|
| 8,509,350 | B2* | 8/2013 | Zhang | H04W 52/16 375/260 |
| 8,811,510 | B2* | 8/2014 | Zhuang et al. | 375/267 |
| 8,824,384 | B2* | 9/2014 | Nam | H04L 1/0003 370/329 |
| 9,008,675 | B2* | 4/2015 | Seo | H04J 11/005 455/418 |
| 9,072,054 | B2* | 6/2015 | Ji | H04W 52/047 1/1 |
| 9,113,419 | B2* | 8/2015 | Zhang | H04W 52/146 1/1 |
| 2011/0085618 | A1* | 4/2011 | Zhuang | H04L 25/021 375/296 |
| 2011/0116437 | A1* | 5/2011 | Chen et al. | 370/312 |
| 2011/0275394 | A1* | 11/2011 | Song et al. | 455/509 |
| 2011/0310830 | A1* | 12/2011 | Wu et al. | 370/329 |
| 2012/0033595 | A1* | 2/2012 | Aoyama et al. | 370/311 |
| 2012/0044872 | A1* | 2/2012 | Aydin et al. | 370/328 |
| 2012/0115469 | A1* | 5/2012 | Chen et al. | 455/434 |
| 2012/0213107 | A1* | 8/2012 | Jang et al. | 370/252 |
| 2012/0213137 | A1* | 8/2012 | Jeong et al. | 370/311 |
| 2012/0275322 | A1* | 11/2012 | Ji et al. | 370/252 |
| 2012/0307922 | A1* | 12/2012 | Simonsson et al. | 375/260 |
| 2012/0327821 | A1* | 12/2012 | Lin et al. | 370/280 |

(Continued)

*Primary Examiner* — Mounir Moutaouakil
(74) *Attorney, Agent, or Firm* — Dentons US LLP

(57) ABSTRACT

A method for receiving a downlink signal from a base station (BS) in a multicast broadcast single frequency network (MBSFN) subframe is disclosed. The method is performed by a user equipment (UE) and includes receiving information indicating an MBSFN subframe configured as an almost blank subframe (ABS) (ABS MBSFN subframe) among MBSFN subframes of which a data region is allocated a reduced transmission power lower than a transmission power in a data region of a normal subframe, and demodulating the downlink signal received in the data region of the ABS MBSFN subframe based on a cell-specific reference signal (CRS) in a control region of the ABS MBSFN subframe according to the information.

20 Claims, 15 Drawing Sheets

(56) References Cited

U.S. PATENT DOCUMENTS

| | | | |
|---|---|---|---|
| 2013/0003578 A1* | 1/2013 | Hu et al. | 370/252 |
| 2013/0017793 A1* | 1/2013 | Henttonen et al. | 455/63.1 |
| 2013/0028149 A1* | 1/2013 | Chen et al. | 370/280 |
| 2013/0028161 A1* | 1/2013 | Maeda et al. | 370/311 |
| 2013/0029657 A1* | 1/2013 | Gao et al. | 455/422.1 |
| 2013/0039338 A1* | 2/2013 | Suzuki | H04W 36/0094 370/331 |
| 2013/0045740 A1* | 2/2013 | Gayde et al. | 455/436 |
| 2013/0045770 A1* | 2/2013 | Aschan et al. | 455/522 |
| 2013/0058234 A1* | 3/2013 | Yang et al. | 370/252 |
| 2013/0229971 A1* | 9/2013 | Siomina | H04W 24/10 370/312 |
| 2013/0286883 A1* | 10/2013 | Kim et al. | 370/252 |
| 2013/0315092 A1* | 11/2013 | Yu et al. | 370/252 |
| 2014/0112254 A1* | 4/2014 | Lindoff | H04W 74/002 370/328 |
| 2014/0119334 A1* | 5/2014 | Kazmi et al. | 370/330 |
| 2014/0211734 A1* | 7/2014 | Seo | H04J 11/0056 370/329 |
| 2014/0313923 A1* | 10/2014 | Yang | H04L 27/261 370/252 |

\* cited by examiner

METHODS FOR TRANSMITTING AND RECEIVING DOWNLINK DATA IN MBSFN SUBFRAME AND APPARATUSES THEREOF

Pursuant to 35 U.S.C. §119(e), this application claims the benefit of U.S. Provisional Patent Application No. 61/557,882, filed on Nov. 9, 2011, and U.S. Provisional Patent Application No. 61/559,681, filed on Nov. 14, 2011 which is hereby incorporated by reference as if fully set forth herein.

BACKGROUND OF THE INVENTION

1. Field of the Invention

The present invention relates to power allocation of a wireless communication system, and more particularly, to a method and apparatus for determining a transmission power for a multicast broadcast single frequency network (MBSFN) subframe for intercell interference coordination (ICIC) in a multi-cell wireless communication system.

2. Discussion of the Related Art

In this disclosure, the term heterogeneous network refers to a network in which a macro eNB and a micro eNB coexist even when the same radio access technology (RAT) is used. A heterogeneous cell refers to time-frequency resources in such a heterogeneous network.

For example, under the assumption of a heterogeneous network in which a micro eNB and a macro eNB are adjacent to each other, if a User Equipment (UE) served by the micro eNB receives a desired signal from the micro eNB, the UE may be subjected to interference by a strong signal from the macro eNB.

Such interference may be expressed as intercell interference and the above example relates to intercell interference generated from the eNB to the UE on downlink. Similarly, intercell interference may also be generated from the UE to the eNB on uplink.

Accordingly, a method for providing transmission power information for the specific downlink subframe is needed in a multi-cell wireless communication environment in which intercell interference is generated, so that data demodulation performance of a UE configured to receive a specific downlink subframe and interference elimination performance of a UE affected by interference caused by the specific downlink subframe.

SUMMARY OF THE INVENTION

The present invention is devised to solve intercell interference and is intended to provide a method for improving demodulation performance of a downlink signal when an almost blank subframe (ABS) is configured in a downlink subframe.

According to an embodiment of the present invention, a method for a user equipment (UE) to receive a downlink signal from a base station (BS) in a multicast broadcast single frequency network (MBSFN) subframe includes receiving information indicating an MBSFN subframe configured as an almost blank subframe (ABS) (an ABS MBSFN subframe) among MBSFN subframes, wherein a reduced transmission power lower than a transmission power in a data region of a normal subframe is allocated to a data region of the ABS MBSFN subframe, and demodulating the downlink signal received in the data region of the ABS MBSFN subframe based on a cell-specific reference signal (CRS) in a control region of the ABS MBSFN subframe according to the information.

The information indicating the ABS MBSFN subframe may be received from the BS through higher layer signaling.

The method may further include receiving information about an antenna virtualization matrix and a precoding matrix, for demodulation of the downlink signal based on the CRS, from the BS.

The method may further include receiving a UE-specific reference signal (RS) to which a higher transmission power than the reduced transmission power is allocated in the data region of the ABS MBSFN subframe, wherein a transmission power of the UE-specific RS is individually allocated to each MBSFN subframe, each OFDM symbol in the MBSFN subframe, or each antenna configured to transmit the UE-specific RS, and wherein both the UE-specific RS and the CRS are used for demodulation of the downlink signal.

The method may further include receiving information about the transmission power of the UE-specific RS from the BS.

The information about the transmission power of the UE-specific RS may be received from the BS through higher layer signaling.

According to another embodiment of the present invention, a method for a base station (BS) to transmit a downlink signal to a user equipment (UE) in a multicast broadcast single frequency network (MBSFN) subframe includes configuring at least one of MBSFN subframes as an almost blank subframe (ABS), wherein a reduced transmission power lower than a transmission power in a data region of a normal subframe is allocated to a data region of the ABS, and transmitting information indicating the MBSFN subframe configured as the ABS (ABS MBSFN) to the UE, wherein the information allows the UE to demodulate the downlink signal received in the data region of the ABS MBSFN subframe based on a cell-specific reference signal (CRS) in a control region of the ABS MBSFN subframe.

The information indicating the ABS MBSFN subframe may be transmitted to the UE through higher layer signaling.

The method may further include transmitting information about an antenna virtualization matrix and a precoding matrix, for demodulation of the downlink signal based on the CRS, to the UE.

The method may further include allocating a higher power than the reduced transmission power to a UE-specific reference signal (RS) transmitted in the data region of the ABS MBSFN subframe, wherein the transmission power of the UE-specific RS is individually allocated to each MBSFN subframe, each OFDM symbol in the MBSFN subframe, or each antenna configured to transmit the UE-specific RS, and transmitting information about the transmission power of the UE-specific RS to the UE.

According to still another embodiment of the present invention, a user equipment (UE) configured to receive a downlink signal from a base station (BS) in a multicast broadcast single frequency network (MBSFN) subframe includes a Radio Frequency (RF) unit configured to transmit or receive an RF signal, and a processor configured to control the RF unit, wherein the processor receives information indicating an MBSFN subframe configured as an almost blank subframe (ABS) (an ABS MBSFN subframe) among MBSFN subframes through the RF unit, wherein a reduced transmission power lower than a transmission power in a data region of a normal subframe is allocated to a data region of the ABS MBSFN subframe, and demodulates the downlink signal received in the data region of the ABS MBSFN subframe based on a cell-specific reference signal (CRS) in a control region of the ABS MBSFN subframe according to the information.

The information indicating the ABS MBSFN subframe may be received from the BS through higher layer signaling.

The processor may receive information about an antenna virtualization matrix and a precoding matrix, for demodulation of the downlink signal based on the CRS, from the BS through the RF unit.

The processor may receive, through the RF unit, a UE-specific reference signal (RS) to which a higher transmission power than the reduced transmission power is allocated in the data region of the ABS MBSFN subframe, wherein a transmission power of the UE-specific RS is individually allocated to each MBSFN subframe, each OFDM symbol in the MBSFN subframe, or each antenna configured to transmit the UE-specific RS, and wherein both the UE-specific RS and the CRS are used for demodulation of the downlink signal.

The processor may receive information about the transmission power of the UE-specific RS from the BS through the RF unit.

The information about the transmission power of the UE-specific RS may be received from the BS through higher layer signaling.

According to a further embodiment of the present invention, a base station (BS) configured to transmit a downlink signal to a user equipment (UE) in a multicast broadcast single frequency network (MBSFN) subframe includes a radio frequency (RF) unit configured to transmit and receive an RF signal, and a processor configured to control the RF unit, wherein the processor configures at least one of MBSFN subframes as an almost blank subframe (ABS), wherein a reduced transmission power lower than a transmission power in a data region of a normal subframe is allocated to a data region of the ABS, and transmits information indicating the MBSFN subframe configured as the ABS (ABS MBSFN) to the UE, wherein the information allows the UE to demodulate the downlink signal received in the data region of the ABS MBSFN subframe based on a cell-specific reference signal (CRS) in a control region of the ABS MBSFN subframe.

The information indicating the ABS MBSFN subframe may be transmitted to the UE through higher layer signaling.

The processor may transmit information about an antenna virtualization matrix and a precoding matrix, for demodulation of the downlink signal based on the CRS, to the UE through the RF unit.

The processor may allocate a higher power than the reduced transmission power to a UE-specific reference signal (RS) transmitted in the data region of the ABS MBSFN subframe, wherein the transmission power of the UE-specific RS is individually allocated to each MBSFN subframe, each OFDM symbol in the MBSFN subframe, or each antenna configured to transmit the UE-specific RS, and transmit information about the transmission power of the UE-specific RS to the UE through the RF unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
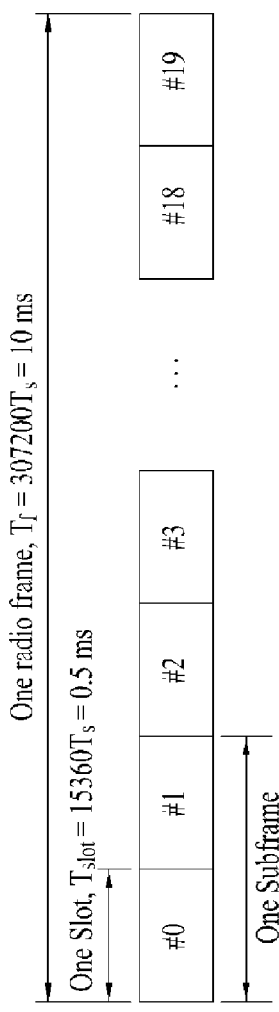
FIGS. 1A and 1B are diagrams that each show an example of a radio frame structure used in a wireless communication system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present invention, a user equipment (UE) may be fixed or mobile and include various apparatuses which communicate with a base station (BS) and transmit and receive user data and/or a variety of control information. The UE may be referred to as a terminal Equipment, a mobile station (MS), a mobile terminal (MT), a user terminal (UT), a subscriber station (SS), a wireless device, a personal digital assistant (PDA), a wireless modem, a handheld device, etc. In the present invention, a base station (BS) refers to a fixed station which communicates with a UE and/or another BS and exchanges a variety of data and control information. The BS is referred to as an advanced base station (ABS), a node-B (NB), an evolved-NodeB (eNB), a base transceiver system (BTS), an access point (AP), a processing server (PS), etc.

In the present invention, a PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) refers to a set of resource elements or a set of time-frequency resources carrying DCI (Downlink Control Information)/CFI (Control Format Indicator)/downlink ACK/NACK (ACKnowlegement/Negative ACK)/downlink data. In addition, a PUCCH (Physical Uplink Control CHannel)/PUSCH (Physical Uplink Shared CHannel) refers to a set of resource elements or a set of time-frequency resources carrying UCI (Uplink Control Information)/uplink data. In the present invention, in particular, time-frequency resources or resource elements (REs) allocated to or belonging to PDCCH/PCFICH/PHICH/PDSCH/PUCCH/PUSCH are referred to as PDCCH/PCFICH/PHICH/PDSCH/PUCCH/PUSCH REs or PDCCH/PCFICH/PHICH/PDSCH/PUCCH/PUSCH resources. Accordingly, in the present invention, transmission of a PUCCH/PUSCH by a UE means that an uplink control information/uplink data/random access signal is transmitted on a PUCCH/PUSCH. In the present invention, transmission of a PDCCH/PCFICH/PHICH/PDSCH by a BS means that downlink data/control information is transmitted on a PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

Figure 1B:
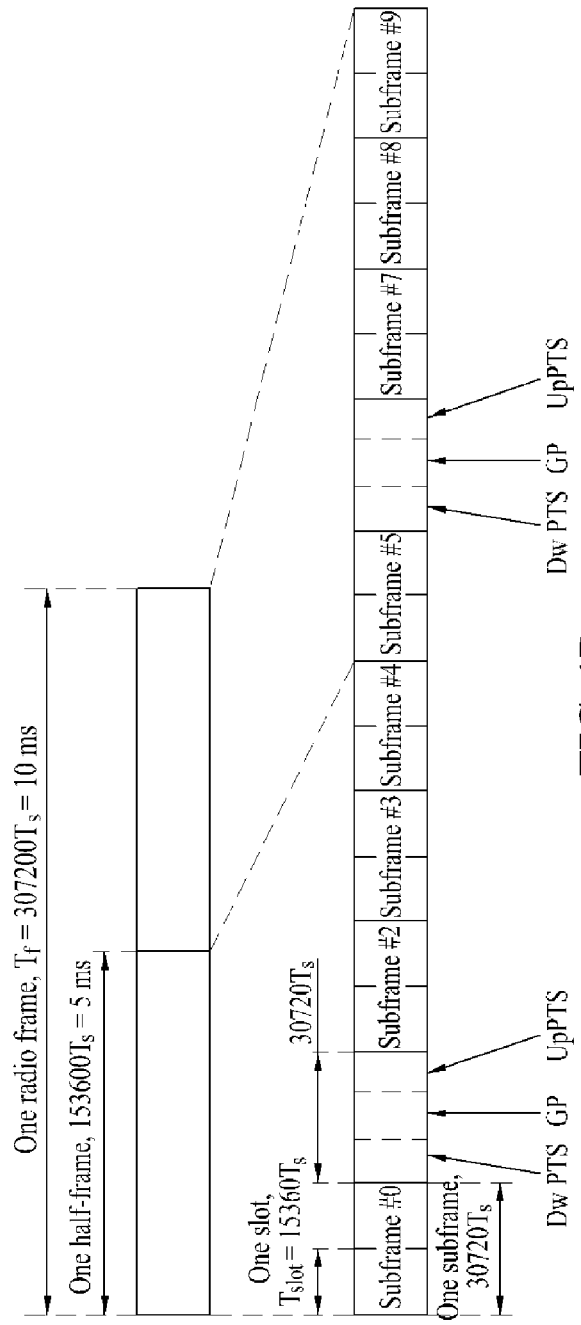

FIGS. 1A and 1B are diagrams that each show an example of a radio frame structure used in a wireless communication system. In particular, FIG. 1A shows a radio frame structure used in frequency division duplex (FDD) in 3GPP LTE(-A) and FIG. 1B shows a radio frame structure used in time division duplex (TDD) in 3GPP LTE(-A).

Referring to FIGS. 1A and 1B, a radio frame used in 3GPP LTE(-A) has a length of 10 ms ($307200 \cdot T_s$) and includes 10 subframes with the same size. The 10 subframes of the radio frame may be numbered. $T_s$ denotes sampling time, and is represented by $T_s=1/(2048*15 \text{ kHz})$. Each of the subframes has a length of 1 ms and includes two slots. The 20 slots of one radio frame may be sequentially numbered from 0 to 19. Each of the slots has a length of 0.5 ms. A time for transmitting one subframe is defined as a transmission time interval (TTI). Time resources may be divided by a radio frame number (or a radio frame index), a subframe number (or a subframe index), a slot number (or a slot index), etc.

The radio frame may be differently configured according to duplex mode. For example, in an FDD mode, since downlink (DL) transmission and uplink (UL) transmission are divided according to frequency, a radio frame includes only one of a DL subframe or a UL subframe in a predetermined frequency band of a predetermined carrier frequency. In a TDD mode, since downlink (DL) transmission and uplink (UL) transmission are divided according to time, a radio frame includes both a DL subframe and a UL subframe in a predetermined frequency band of a predetermined carrier frequency.

Table 1 shows a DL-UL configuration of subframes within a radio frame, in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes three fields of DwPTS (Downlink Pilot TimeSlot), GP (Guard Period) and UpPTS (Uplink Pilot TimeSlot). DwPTS is a time slot reserved for DL transmission and UpPTS is a time slot reserved for UL transmission.

Figure 2:
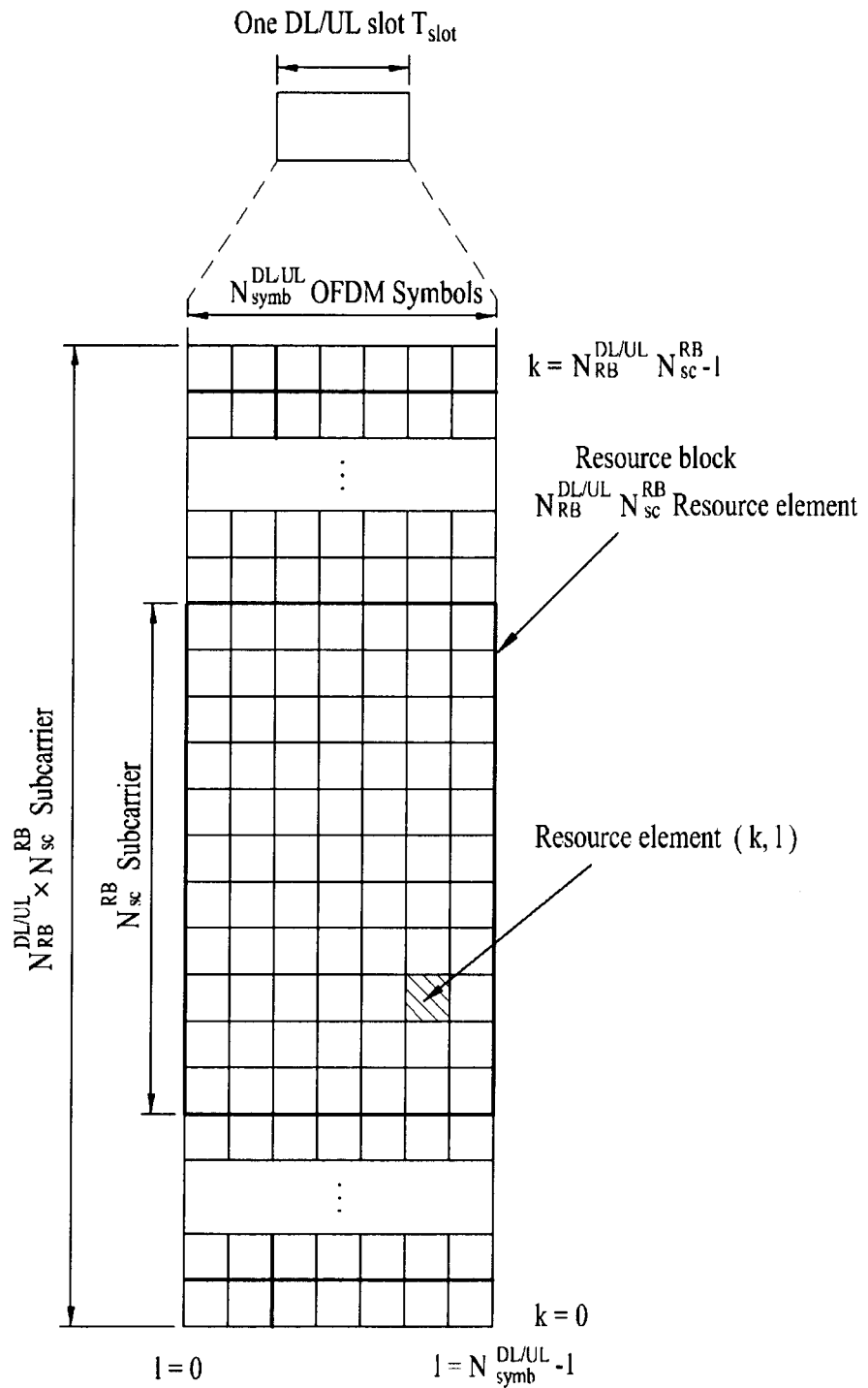
FIG. 2 is a diagram showing an example of a downlink/uplink (DL/UL) slot structure in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{DL}_{RB}$ denotes the number of RBs in a UL slot. $N^{DL}_{RB}$ and $N^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB}*N^{RB}_{sc}$ subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to a resource element (RE) or tone. Accordingly, one RB includes $N^{DL/UL}_{symb}*N^{RB}_{sc}$ REs. Each RE within a resource grid may be uniquely defined by an index pair (k, 1) within one slot. k is an index applied from 0 to $N^{DL/UL}_{RB}*N^{RB}_{sc}-1$ in a frequency domain, and 1 is an index from 0 to $N^{DL/UL}_{symb}-1$ in a time domain.

In one subframe, two RBs respectively located in two slots of the subframe while occupying the same $N^{RB}_{sc}$ consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, $n_{PRB}=n_{VRB}$. The localized VRBs are numbered from 0 to $N^{DL}_{VRB}-1$ and $N^{DL}_{VRB}=N^{DL}_{RB}$. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

Figure 3:
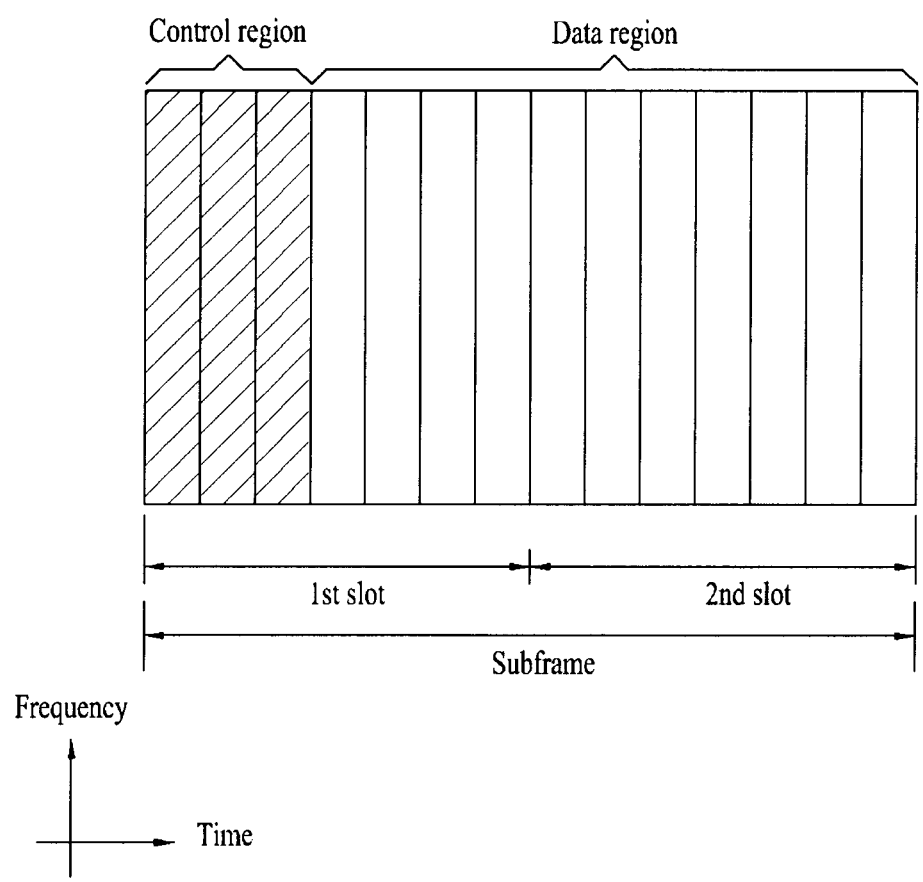
FIG. 3 is a diagram showing a downlink subframe structure used in a 3GPP LTE(-A) system.

FIG. 3 is a diagram showing a downlink subframe structure used in a 3GPP LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbols used in the control region correspond to the data region to which a physical downlink shared channel (PDSCH) is allocated. Hereinafter, a resource region available for PDSCH transmission in a DL subframe is referred to as a PDSCH region. Examples of a DL control channel used in 3GPP LTE include PCFICH (Physical Control Format Indicator Channel), PDCCH (Physical Downlink Control Channel), PHICH (Physical hybrid ARQ indicator Channel), etc. The PCFICH is transmitted in a first OFDM symbol of a subframe and carries information about the number of OFDM symbols used for transmission of a control channel within a subframe. The PHICH carries a HARQ ACK/NACK (acknowledgment/negative-acknowledgment) as a response to UL transmission.

Control transmitted via a PDCCH is referred to as downlink control information (DCI). The DCI includes resource allocation information of a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a Tx power control command set of individual UEs in a UE group, a Tx power control command, activation indication information of voice over IP (VoIP), etc. The size and usage of the DCI carried by one PDCCH may be changed according to DCI format and the size of the DCI may be changed according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
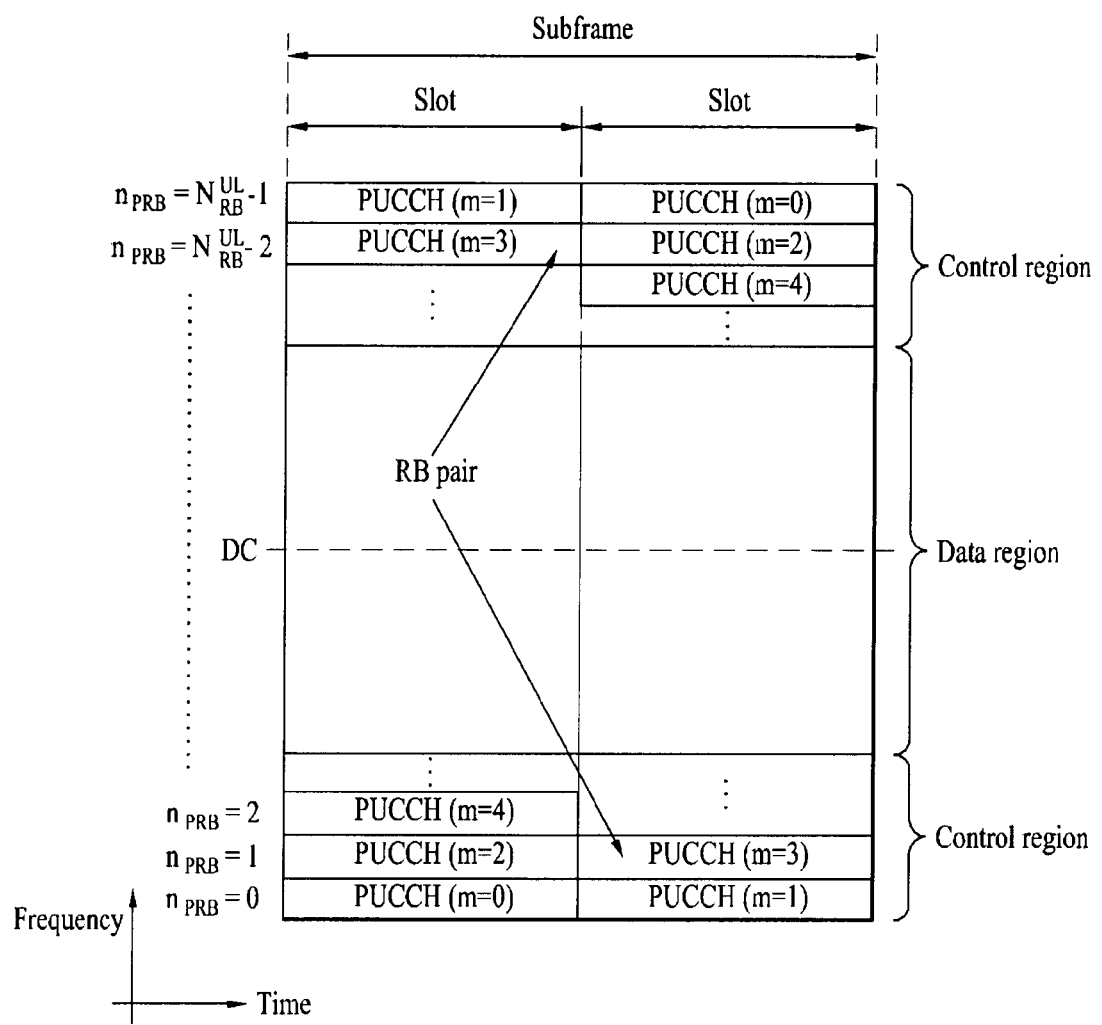
FIG. 4 is a diagram showing an example of an uplink subframe structure used in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are used to transmit ACK/NACK information and PUCCH format 2 series are mainly used to carry channel state information such as CQI (channel quality indicator)/PMI (precoding matrix index)/RI (rank index).

Figure 5:
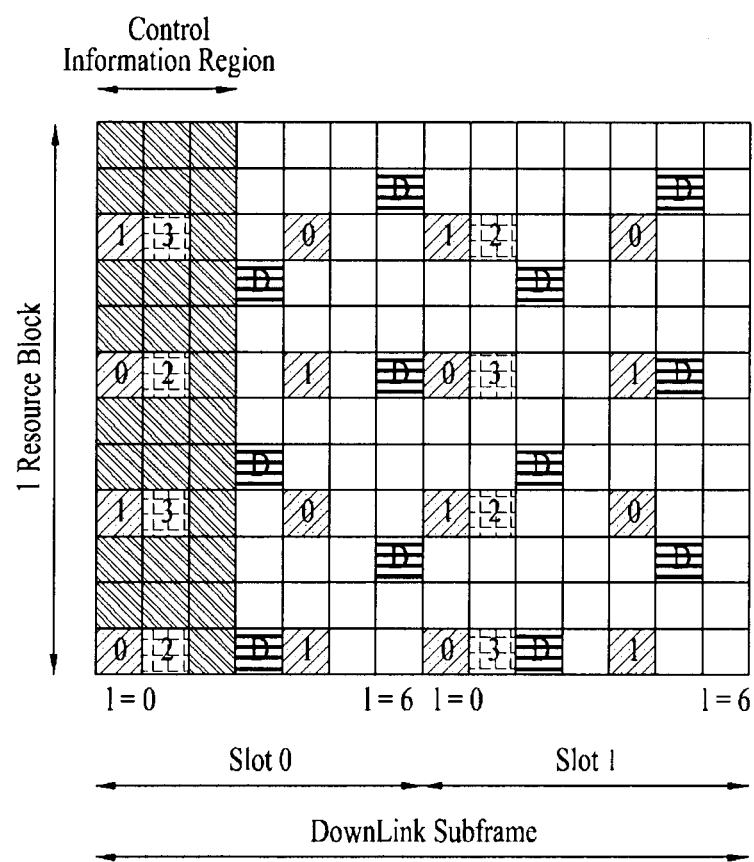
FIGS. 5 and 6 show CRS and DRS patterns defined in a legacy 3GPP LTE system.
Figure 6:
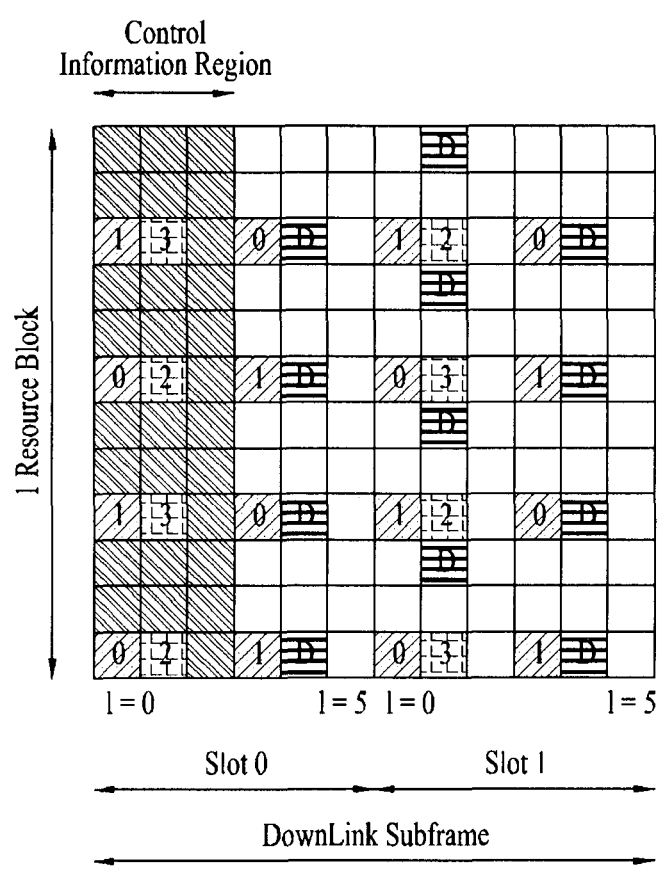

FIGS. 5 and 6 show CRS and DRS patterns mapped onto a downlink RB pair, defined in a legacy 3GPP LTE system (e.g. Release-8). A downlink RB pair as an RS mapping unit may be expressed in units of one subframe in the time domain and 12 subcarriers in the frequency domain. That is, one RB pair has a length of 14 OFDM symbols in a normal Cyclic Prefix (CP) (FIG. 5) and a length of 12 OFDM symbols in an extended CP (FIG. 6) in the time domain.

Prior to description of FIGS. 5 and 6, an RS will now be described.

Reference Signal (RS)

When packets are transmitted in a wireless communication system, the packets are transmitted through a radio channel and thus signal distortion may occur during a signal transmission process. To correctly receive the distorted signal at a reception side, distortion of the received signal should be corrected using channel information. To detect the channel information, a method of transmitting a signal, of which both the transmission side and the reception side are aware to detect the channel information using a distortion degree when the signal is received through a channel is mainly used. The above signal is referred to as a pilot signal or an RS.

When a signal is transmitted and received using multiple antennas, the receiving side should discern a channel state between each transmission antenna and each receive antenna to correctly receive the signal. Accordingly, an additional RS should be present per transmission antenna.

A downlink RS includes a Common Reference Signal (CRS) shared among all UEs in a cell and a Dedicated Reference Signal (DRS) for a specific UE only. It is possible to provide information for channel estimation and demodulation using such RSs.

The reception side (UE) may estimate the channel state from the CRS and feed back an indicator associated with channel quality, such as a Channel Quality Indicator (CQI), a Precoding Matrix Index (PMI) and/or a Rank Indicator (RI), to the transmission side (eNB). The CRS may also be called a cell-specific RS. Alternatively, an RS associated with feedback of Channel State Information (CSI) such as CQI/PMI/RI may be separately defined as a CSI-RS.

The DRS may be transmitted through corresponding REs if data demodulation on a PDSCH is necessary. The UE may receive information about the presence/absence of the DRS from a higher layer and receive information indicating that the DRS is valid only when the PDSCH is mapped. The DRS may also be called a UE-specific RS or a Demodulation Reference Signal (DMRS).

FIGS. 5 and 6 show the locations of RSs on an RB pair in a system in which an eNB supports four transmission antennas. In FIGS. 5 and 6, REs denoted by '0', '1', '2', and '3' indicate the locations of CRSs of antenna port indexes 0, 1, 2 and 3, respectively. In FIGS. 5 and 6, an RE denoted by 'D' indicates the location of a DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNB). The 3GPP LTE (e.g. Release-8) system supports various antenna configurations and a downlink signal transmission side (eNB) has three types of antenna configuration such as a single antenna, two transmission antennas, and four transmission antennas. If the eNB performs single-antenna transmission, RSs for a single antenna port are arranged. If the eNB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNB performs four-antenna transmission, RSs for four antenna ports are arranged using the TDM/FDM scheme. Channel information estimated by the downlink signal reception side (UE) through the CRSs may be used to demodulate data transmitted using a transmission scheme such as single antenna transmission, transmission diversity, closed-loop spatial multiplexing, open-loop spatial multiplexing, or Multi-User Multiple Input Multiple Output (MU-MIMO).

In the time domain, RSs are arranged starting from a symbol index (l=0) of each slot at a constant interval. The time interval is differently defined according to CP length. The RSs are located on symbol indexes 0 and 4 of the slot in the case of a normal CP and are located on symbol indexes 0 and 3 of the slot in the case of an extended CP. Only RSs for a maximum of two antenna ports are defined in one OFDM symbol. Accordingly, upon four-transmission antenna transmission, the RSs for antenna ports 0 and 1 are located within the symbol indexes 0 and 4 (the symbol indexes 0 and 3 in case of the extended CP) of the slot and the RSs for antenna ports 2 and 3 are located within the symbol index 1 of the slot. The frequency locations of the RSs for the antenna ports 2 and 3 are exchanged with each other in the second slot.

Hereinafter, the DRS will be described in detail.

The DRS (or UE-specific RS) is used to demodulate data. A precoding weight used for a specific UE upon multi-antenna transmission is also used in an RS without change so as to estimate an equivalent channel, in which a transport channel and the precoding weight transmitted from each transmission antenna are combined, when the UE receives the RSs.

A legacy 3GPP LTE system (e.g. Release-8) supports a maximum of four-transmission antenna transmission and defines a DRS for Rank 1 beamforming. The DRS for Rank 1 beamforming is also denoted by an RS for an antenna port index 5.

In an LTE-Advanced (LTE-A) system which is an evolved version of the 3GPP LTE system, high-order MIMO, multi-cell transmission, evolved MU-MIMO, or the like is considered. To support efficient RS management and an evolved transmission scheme, DRS-based data demodulation is considered. That is, separately from the DRS (antenna port index 5) for Rank 1 beamforming defined in the legacy 3GPP LTE (e.g. Release-8) system, DRSs for two or more layers may be defined in order to support data transmission through an added antenna.

Intercell Interference Reduction

If two eNBs (eNB1 and eNB2) are contiguously arranged such that partial coverage of the two eNBs overlaps, a UE served by one eNB may be subjected to interference by a strong downlink signal from the other eNB. For example, if a micro eNB (eNB2) is located within coverage of a macro eNB (eNB1), a UE (UE2) served by the micro eNB (eNB2) may be subjected to interference by a signal from the macro eNB (eNB1). If intercell interference is generated as stated above, the two eNBs may reduce intercell interference through intercell cooperation.

In various exemplary embodiments of the present invention which will be described hereinbelow, it is assumed that signals are smoothly transmitted and received between two eNBs that cause interference and are subjected to interference.

For example, it is assumed that a wired/wireless link (e.g. backhaul link or Un interface) in which a transmission condition, such as transmission bandwidth or time delay, between two eNBs is good is present and thus reliability for transmission and reception of a cooperation signal between the eNBs is high.

It is also assumed that time synchronization between two eNBs is matched within a permissible error range (e.g. the case in which boundaries between downlink subframes of two eNBs that cause interference and are subjected to interference are aligned) and the two eNBs definitely recognize an offset of subframe boundaries between the two eNBs.

For example, eNB1 may be a macro eNB providing a service with a high transmission power to a wide area and eNB2 may be a micro eNB (e.g. pico eNB) providing a service with a low transmission power to a narrow area. If the UE (UE2) that is located in a cell boundary area of eNB2 and is served by eNB2 is subjected to strong interference from eNB1, it may be difficult to perform effective communication without proper inter-cell cooperation.

Especially, there is a high possibility that such intercell interference occurs in a situation in which many UEs are connected to the micro eNB (eNB2) having a low power to disperse load caused by service provision of the macro eNB (eNB1).

For example, if the UE desires to select a serving eNB, receive powers of downlink signals from respective eNBs may be calculated and compared using a scheme of adding a prescribed adjustment value (bias value) to the receive power from the micro eNB and not adding the adjustment value to the receive power from the macro eNB and, as a result, the UE may select an eNB providing a higher downlink receive power as the serving eNB. Accordingly, it is possible to connect more UEs to the micro eNB.

Although the strength of a downlink signal received by the UE from the macro eNB is much stronger than that received from the micro eNB, the micro eNB may be selected as the serving eNB and thus the UE connected to the micro eNB may be subjected to strong interference from the macro eNB. In this case, UEs located at the boundary of the micro eNB may have difficulty performing correct operation due to strong interference from the macro eNB unless additional intercell cooperation is provided.

Meanwhile, such occurrence of intercell interference is purely exemplary and it is apparent that embodiments described in the present invention are identically applicable to situations different from the above case, (e.g. the case in which the micro eNB causes interference and the macro eNB is subjected to interference or the case in which intercell interference occurs between micro eNBs or between macro eNBs).

In a wireless communication system such as 3GPP LTE, an Energy Per Resource Element (EPRE) indicating an energy value of each RE is defined for transmission power allocation of a downlink resource.

An eNB determines transmission power allocation of a downlink resource as an energy value of each RE. The transmission power allocation of the downlink resource is determined based on an EPRE for a CRS and an EPRE for a resource region of a PDSCH on which data is actually transmitted is expressed in the ratio to an EPRE of the CRS.

For example, the ratio of the EPRE of the PDSCH to the EPRE of the CRS in an OFDM symbol duration in which the CRS is not present in a downlink subframe in the time domain is defined as $\rho_A$ and the ratio of the EPRE of the PDSCH to the EPRE of the CRS in an OFDM symbol duration in which the CRS is present in a downlink subframe in the time domain is defined as $\rho_B$.

At this time, $\rho_A$ may be determined by a power offset $\delta_{power\ offset}$ according to whether an MU-MIMO transmission structure is applied and by a UE-specific parameter $P_A$. Here, $\delta_{power\ offset}$ may be given as 0 dB for all PDSCH transmission schemes except for MU-MIMO and the UE-specific parameter $P_A$ may be signaled to the UE by a higher layer. $\rho_B/\rho_A$ may be determined by the number of antenna ports which are cell-specifically configured and a cell-specific parameter $P_B$ which is signaled by the higher layer and may be given as shown in Table 3 below.

TABLE 3

| | $\rho_B/\rho_A$ | |
|---|---|---|
| $P_B$ | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

Meanwhile, a dynamic range of a transmission power for each RE in an LTE wireless communication system, etc. may be limited as shown in Table 4 according to requirements on a radio frequency (e.g. Error Vector Magnitude (EVM) and out-of-band emission).

TABLE 4

| Modulation scheme used on the RE | RE power control dynamic range (dB) | |
|---|---|---|
| | (down) | (up) |
| QPSK (PDCCH) | −6 | −4 |
| QPSK (PDSCH) | −6 | −3 |
| 16QAM (PDSCH) | −3 | −3 |
| 64QAM (PDSCH) | 0 | 0 |

Table 4 shows an example of a dynamic range of RE transmission power control according to a modulation scheme of an E-UTRA eNB. The dynamic range of transmission power control for RE indicates a difference between a transmission power for each RE and an average transmission power for REs when an eNB transmits data at a maximum transmission power under a specified reference condition. The transmission power of an RE may be restricted by requirements for out-of-band emission, requirements for an EVM, and the like. Here, out-of-band emission is one form of unwanted emission and refers to emission on a frequency immediately outside a bandwidth of a channel as a result of non-linearity of a modulation process and a transmitter. The EVM refers to a difference between an ideal symbol and a measured symbol after quantization and this difference is called an error vector. The EVM is defined as a square root of the ratio of a mean reference power to a mean error vector power and may be expressed in percent.

The dynamic range of a transmission power for each RE of Table 4 may be determined by an upper limit (up) and a lower limit (down) of the transmission power for each RE based on the transmission power for each RE when an eNB transmits a signal at a maximum transmission power under a specified reference condition. Specifically, the upper limit of the transmission power for each RE may be determined by requirements for out-of-band emission according to non-linearity of the above-described modulation process and transmitter. The lower limit of the transmission power for each RE may be determined by requirements for the above-described EVM.

Accordingly, in an environment shown in Table 4, the transmission power of a specific subframe (e.g. NZP-ABS) may be restricted by the lower limit of Table 4. In this case, power allocation for the resource of a downlink subframe, determined by $\rho_A$ and $\rho_B$ in a normal downlink subframe transmitted through higher layer signaling from the eNB to the UE may be ineffective in a specific subframe.

Hereinafter, a method for allocating power or providing power information will be described for a multicast broadcast single frequency network (MBSFN) subframe according to an exemplary embodiment of the present invention.

The present invention proposes a method for using a CRS according to configuration of a reduced power almost blank subframe (r-ABS) or raising transmission powers of a UE-specific RS (hereinafter, a UE-RS) and a CSI-RS, when transmitting unicast data in an MBSFN subframe configured as the r-ABS for intercell interference coordination (ICIC) in a multi-cell wireless communication environment having intercell interference, thereby improving data demodulation performance in the MBSFN subframe.

Figure 7:
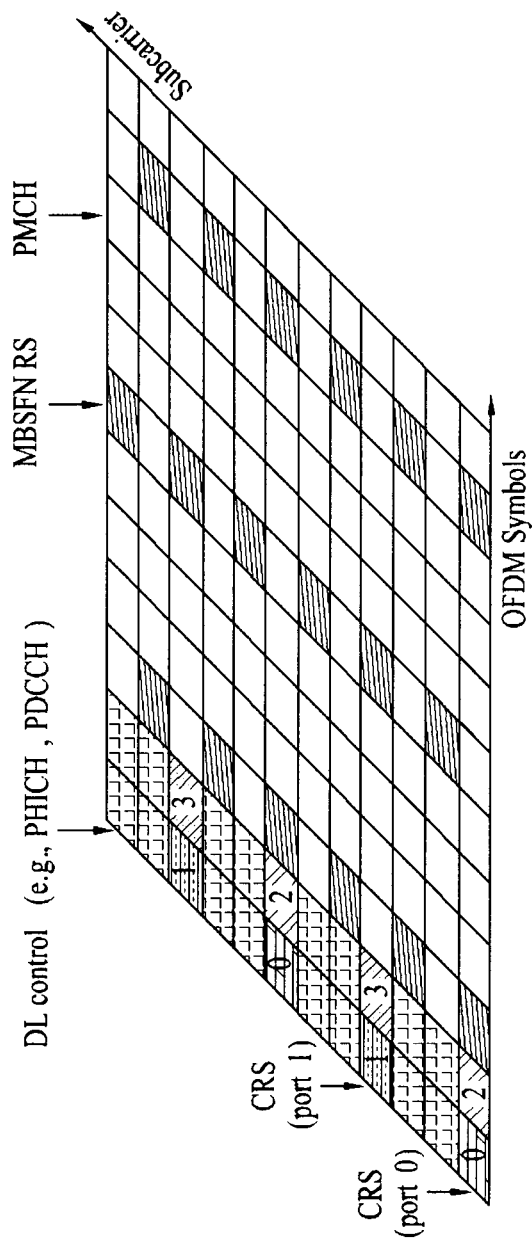
FIG. 7 shows an MBSFN subframe according to a legacy LTE system.

FIG. 7 shows an MBSFN subframe according to a legacy LTE system. In a wireless communication system including 3GPP LTE, an LTE multimedia broadcast/multicast service (MBMS) is defined in order to efficiently provide broadcast and multicast services. The LTE MBMS applies a radio interface for transmitting broadcast and multicast data in a structure in which multiple cells operate like one synchronized single frequency network. Meanwhile, in an aspect of a physical layer, the MBSFN data is transmitted in correspondence to a physical multicast channel (PMCH) and the PMCH recognizes a valid channel of a form in which channels of multiple cells are combined. Accordingly, in the PMCH, an MBSFN RS for estimating the valid channel is additionally transmitted. When the PMCH and a PDSCH coexist in a specific subframe of a frequency domain, a UE may bear the burden of simultaneously performing CRS based channel estimation and MBSFN RS based channel estimation. In LTE, in order to solve the above problem, a subframe in which the PMCH is transmitted is referred to as an MBSFN subframe and the MBSFN subframe has constraints of not transmitting the PDSCH therein. Accordingly, the MBSFN subframe includes a downlink control region within a first and/or second OFDM symbol(s) and the other regions, i.e. the PMCH. The CRS is transmitted in the control region, whereas no CRS is present in the PMCH. FIG. 7 shows the MBSFN subframe when the CRS is configured through four antenna ports.

Figure 8:
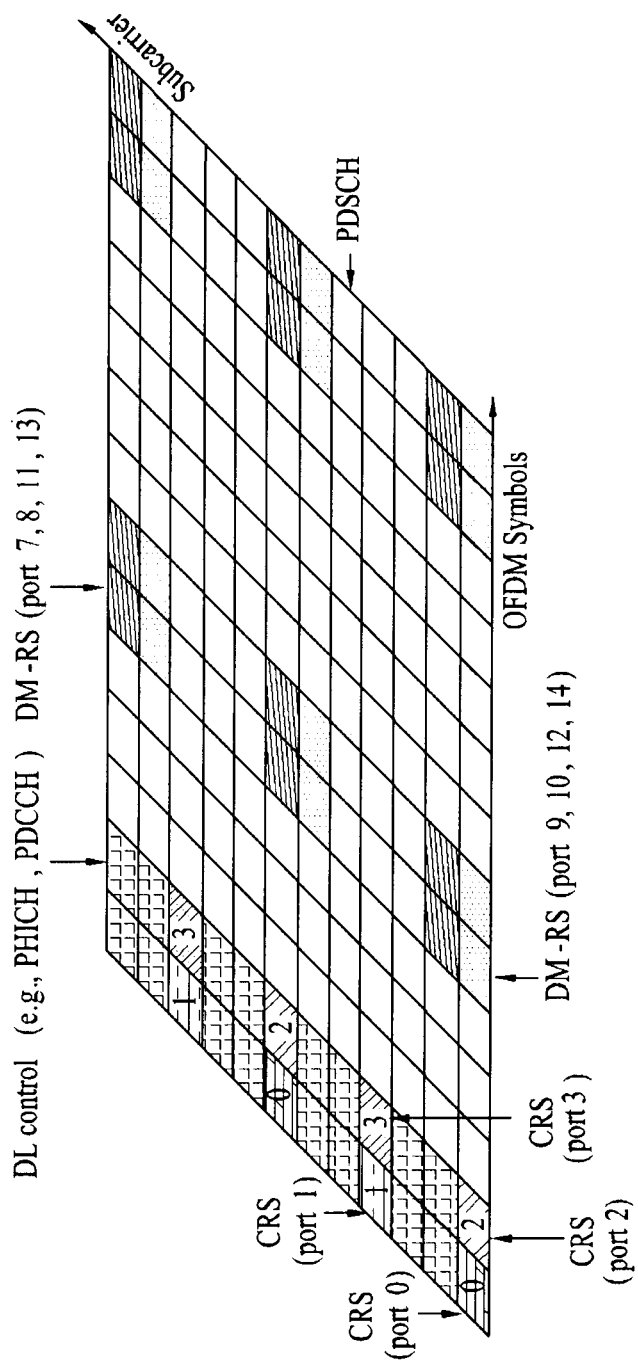
FIG. 8 shows an MBSFN subframe in an LTE-A system according to an exemplary embodiment of the present invention.

FIG. 8 shows an MBSFN subframe in an LTE-A system according to an exemplary embodiment of the present invention. The MBSFN subframe is semi-statically allocated according to system information block (SIB) type 2 which is system information transmitted through a higher layer. The system information may be updated at an interval of about two or three times per hour. Therefore, the transmission pattern of the MBSFN subframe may continue for a considerable time. However, data transmission for the MBMS is not always performed and, therefore, partial resources among allocated MBSFN subframes may not be used for the MBMS.

In LTE-A, a method of using the unused MBSFN subframe has been discussed and, in consideration of the fact that legacy LTE UEs do not expect that unicast data will be transmitted in the MBSFN subframe, a method for transmitting the unicast data for LTE-A UEs through the MBSFN subframe has been proposed.

FIG. 8 depicts the configuration of the MBSFN subframe in which the unicast data is transmitted in an environment in which 4 antenna ports are configured for CRSs and 8 antenna ports are configured for UE-RSs (e.g. DM-RSs). The CRSs are transmitted only in the control region of the MBSFN subframe and signals for the LTE-A UE, such as the PDSCHs, UE-RSs, CSI-RSs, etc., are transmitted in the other regions except for the control region.

Hereinafter, it is defined that each MBSFN subframe is divided into an MBSFN region and a non-MBSFN region, the non-MBSFN region corresponds to a first OFDM symbol and/or a second OFDM symbol in the MBSFN subframe, and the MBSFN region corresponds to the other OFDM symbols which are not used for the non-MBSFN region. It is apparent that the control region of the MBSFN subframe corresponds to the non-MBSFN region and the data region of MBSFN subframe corresponds to the MBSFN region.

Meanwhile, in an LTE-A system, an Almost Blank Subframe (ABS) structure has been proposed as one ICIC scheme for solving interference in a heterogeneous cell environment. To solve the interference problem, an eNB may configure or set a specific MBSFN subframe as an ABS of a reduced power. Generally, the ABS refers to a subframe in which signals except for control related signals such as an RS are not transmitted or the signals are transmitted at a power value of 0. That is, the ABS corresponds to a subframe in which signals except for the RS are almost blank. In this disclosure, a reduced power ABS (r-ABS) refers to a subframe in which signals are transmitted at a power lower than a transmission power of a normal subframe but at a power higher than a power value of 0.

For instance, a subframe (which is not an MBSFN subframe) configured as an ABS may refer to a subframe in which only CRSs are transmitted in a control region and a data region and other control information and data are not transmitted. Nonetheless, downlink channels and downlink signals such as a physical broadcast channel (PBCH), a primary synchronization signal (PSS), and a secondary synchronization signal (SSS) may be transmitted even in the ABS.

For example, the MBSFN subframe configured as the r-ABS (hereinafter, an ABS MBSFN subframe) may refer to a subframe in which, in a control region of the ABS MBSFN subframe, signals are transmitted at a transmission power according to a conventional power allocation scheme and, in the data region of the ABS MBSFN subframe, downlink signals are transmitted at a power lower than the transmission power according to the conventional power allocation scheme.

In this specification and claims, the ABS and r-ABS will be used interchangeably. That is, the r-ABS may mean both the ABS and the r-ABS and the ABS may mean both the ABS and the r-ABS.

Figure 9:
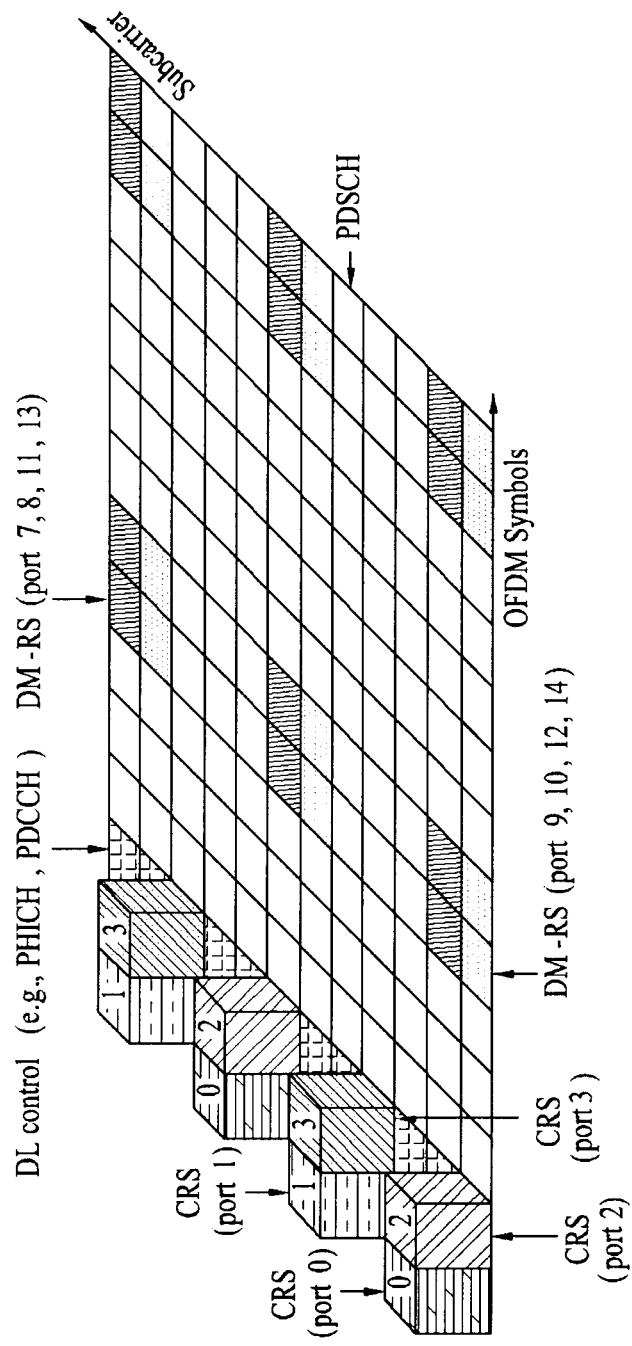
FIG. 9 shows an MBSFN subframe in an LTE-A system according to an exemplary embodiment of the present invention.

In the ABS or r-ABS, RSs (e.g. CRSs) for legacy LTE UEs that do not support LTE-A and system information (e.g. PBCHs, SIBs, PSSs, SSSs, etc.) are transmitted and other unicast data is not transmitted or is transmitted at a very low transmission power. In this case, if an MBSFN subframe used for unicast data transmission is configured as the r-ABS, a transmission power of a CRS in the MBSFN subframe is maintained and unicast data such as a PDCCH and a PDSCH is transmitted at a lower transmission power $P_{ABS}$ in order to support legacy UEs. Accordingly, in the MBSFN subframe configured as the r-ABS, the CRS has an effect of raising the transmission power relative to a DM-RS in the data region of the MBSFN subframe as shown in FIG. 9. Power allocation information in the r-ABS may be transmitted to a UE receiving data through the r-ABS so as to be used for data demodulation and may be transmitted to a UE affected by interference from the r-ABS so as to be used for interference elimination. Accordingly, an eNB may transmit transmission power information for the MBSFN subframe to at least one UE.

In other words, even if the r-ABS is applied according to the ICIC scheme, a transmission power of common control data such as a CRS may be maintained at a power when the r-ABS is not applied, in terms of importance of data or stability of overall system operation.

The present invention proposes a method for utilizing a CRS transmitted in a non-MBSFN region or allocating transmission powers of a UE-RS and a CSI-RS transmitted in an MBSFN region by a subframe-specific scheme in order to raise demodulation performance, when transmitting unicast data in an MBSFN subframe configured as an r-ABS for ICIC in a multi-cell wireless communication environment having intercell interference. As an exemplary embodiment of the present invention, operation of the present invention for the case in which an MBSFN subframe is configured as an r-ABS in a 3GPP LTE-A system will be described.

Figure 10A:
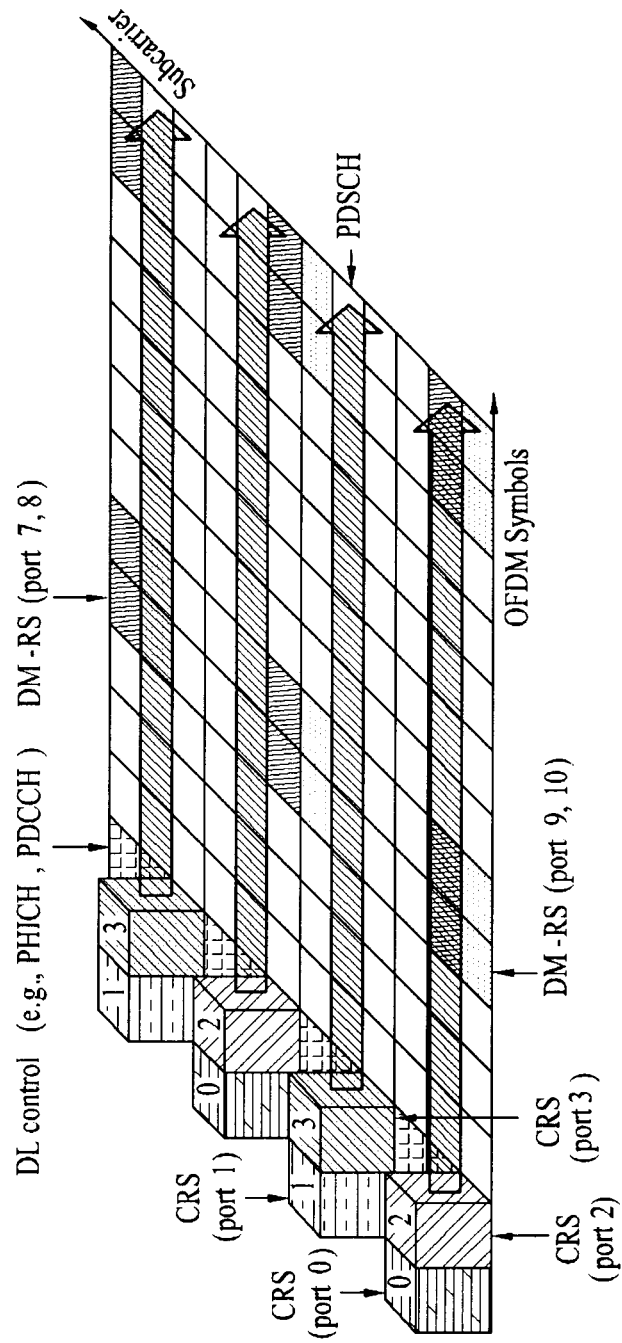
FIGS. 10A and 10B show MBSFN subframes associated with downlink data demodulation according to an exemplary embodiment of the present invention.
Figure 10B:
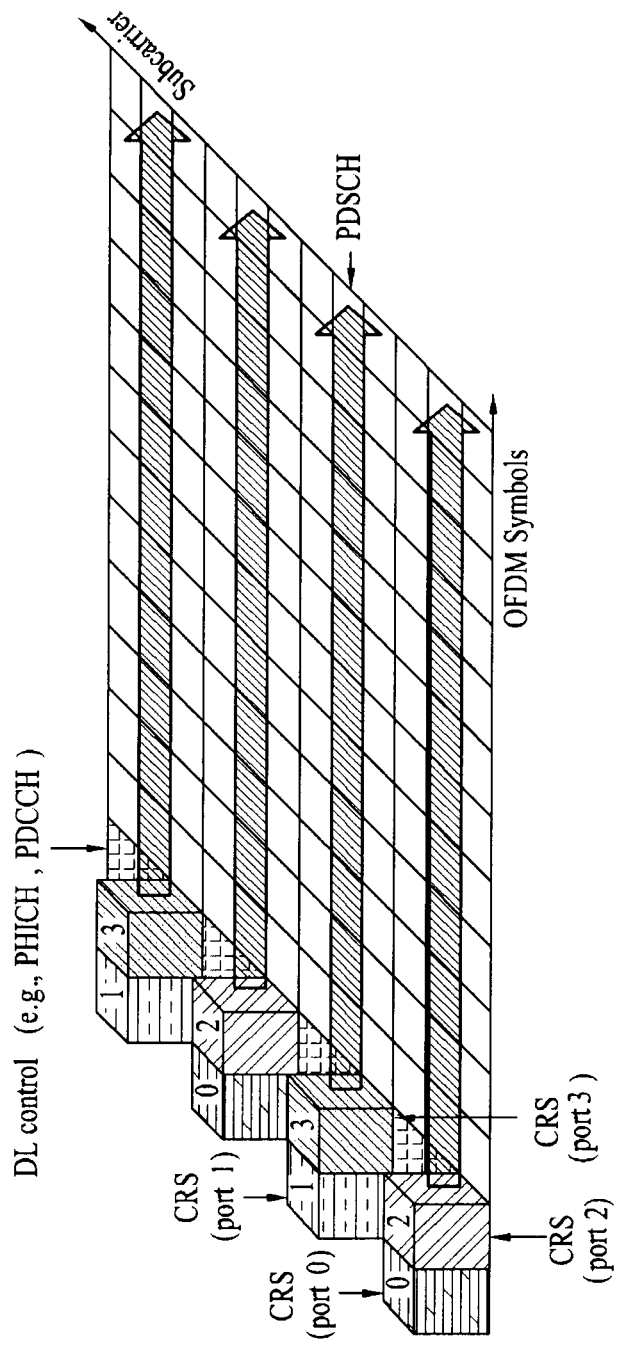

FIG. 10A and FIG. 10B are diagrams briefly explaining operation for demodulation of downlink data according to an exemplary embodiment of the present invention. The embodiment related to FIGS. 10A and 10B is applied when the MBSFN subframe is configured as the r-ABS as in FIG. 9. The exemplary embodiment of the present invention proposes a transmission mode for performing data demodulation based on a CRS in a control region of an MBSFN subframe in which unicast data is transmitted.

Generally, in an MBSFN region of an MBSFN subframe, a PMCH is transmitted in the form of an MBSFN from a plurality of cells. From the viewpoint of a UE, a radio channel on which the PMCH is transmitted is of a form in which channels of the cells in the MBSFN region are combined into one channel. Accordingly, for channel estimation for demodulation of PMCH, the UE cannot use a general CRS transmitted from each cell. Therefore, an MBSFN reference signal for an MBSFN is additionally defined.

However, since a downlink signal such as a PDSCH can be transmitted even in the MBSFN region as described previously, the exemplary embodiment of the present invention proposes demodulation of downlink data within the MBSFN region using the CRS. In an LTE-A system, since the CRS in the MBSFN subframe is transmitted only in a first OFDM symbol and/or a second OFDM symbol in the control region of the subframe and the UE-RS is transmitted in OFDM symbols in a region other than the control region (i.e. a data region or MBSFN region) of the subframe, it is more favorable, in terms of demodulation performance, to perform demodulation using the UE-RS than to perform CRS-based downlink data demodulation. However, when downlink data is transmitted in the MBSFN subframe configured as the r-ABS, a transmission power of the CRS is set to be maintained for legacy LTE UEs, whereas a transmission power of downlink data including the UE-RS is set to be relatively reduced. Accordingly, the present embodiment proposes a transmission mode for demodulating data received in an MBSFN region within the MBSFN subframe using the CRS received from a control region (or non-MBSFN region) within the MBSFN subframe. At this time, the proposed transmission mode may have constraints on the number of antenna ports (e.g. 4) supportable in the CRS. Referring to FIGS. 10A and 10B, CRSs for supporting four antenna ports are transmitted (or allocated) in the non-MBSFN region of the MBSFN subframe and, therefore, other RSs (e.g. DM-RSs) transmitted in the MBSFN region of the MBSFN subframe may be transmitted through four or fewer antenna ports corresponding to the antenna ports of the CRSs or may not be transmitted.

FIG. 10A illustrates an example of DM-RSs transmission in the MBSFN region of the MBSFN subframe through four antenna ports. FIG. 10A depicts (by arrows) demodulation of downlink data transmitted in the MBSFN region through the CRS transmitted in the non-MBSFN region of the MBSFN subframe. FIG. 10B depicts demodulation of downlink data transmitted in the MBSFN region through the CRS transmitted in the non-MBSFN region of the MBSFN subframe as in FIG. 10A, wherein RSs are not transmitted in the MBSFN region of the MBSFN subframe.

According to another exemplary embodiment, it is proposed to indicate whether the CRS transmitted in the control region of the MBSFN subframe is used for demodulation of downlink signal. Physically, an antenna port through which a CRS supporting an LTE UE is transmitted and an antenna port through which a UE-RS, a CSI-RS, etc. supporting an LTE-A UE is transmitted may be independently implemented. Accordingly, in order to use the CRS for data demodulation of the LTE-A UE in FIGS. 10A and 10B, it is necessary to indicate whether an antenna configuration of an eNB transmitting a current signal supports CRS-based data demodulation for the LTE-A UE. In other words, a UE-RS transmitted in a data region of a corresponding subframe is transmitted through the same channel (e.g. a PDSCH) as a channel through which data is transmitted in the data region. However, in the exemplary embodiment of the present invention, unlike the UE-RS, the CRS may be transmitted through a channel different from a channel through which data to be demodulated using the CRS is transmitted. For example, when data is transmitted in a plurality of transmission points such as CoMP scenario 4, a channel through which CRS is transmitted may be different from a channel through which data is transmitted.

Information as to whether CRS-based data demodulation is supported may be transmitted as system information through a higher layer signal. As an example, one bit may be allocated to transmit information as to whether CRS-based data demodulation is supported. At this time, the corresponding information need not necessarily be used only for the MBSFN subframe and may be used for all cases employing the CRS for the LTE-A UE.

Meanwhile, as one means for informing a UE whether CRS-based data demodulation is supported, information indicating an MBSFN subframe configured as an r-ABS among MBSFN subframes may be transmitted to the UE. That is, the eNB may configure the MBSFN subframe as an r-ABS and transmit information indicating the MBSFN subframe configured as the r-ABS to the UE. Upon receiving the information indicating the MBSFN configured as the r-ABS, the UE may demodulate a downlink signal, received in the MBSFN subframe, based on the CRS.

As still another exemplary embodiment, information indicating whether the downlink signal received in the MBSFN subframe configured as the r-ABS is demodulated based on the CRS or based on the UE-RS may be transmitted to the UE. Upon receiving the information, the UE may demodulate the downlink signal transmitted in the MBSFN subframe based on the CRS or UE-RS.

Figure 11:
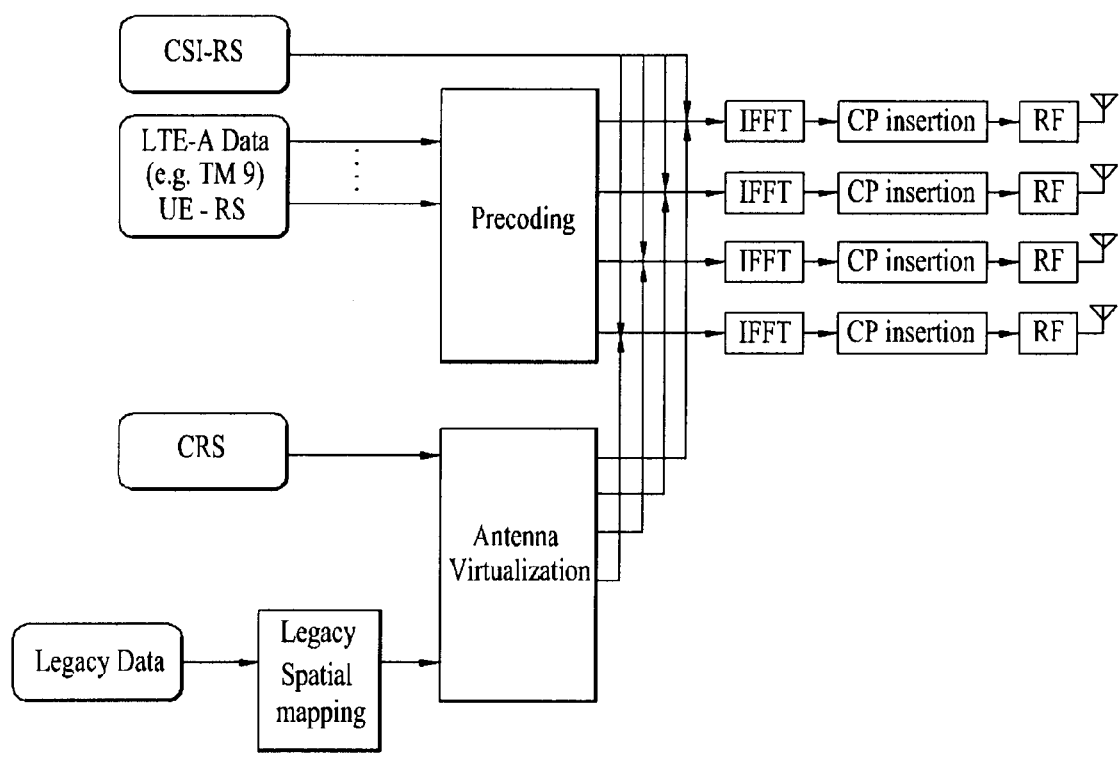
FIG. 11 shows a relationship between antenna ports for a CRS and antenna ports for a DM-RS according to an exemplary embodiment of the present invention.

FIG. 11 shows a relationship between antenna ports for a CRS and antenna ports for a DM-RS according to an exemplary embodiment of the present invention. According to the exemplary embodiment of the present invention, a method is proposed for transmitting information necessary for matching between a channel through which CRS is transmitted and a channel through which data is transmitted to the UE, when demodulating a downlink signal using the CRS in an MBSFN subframe in which unicast data is transmitted. In the LTE-A system, the channel through which the CRS is transmitted may be different from the channel through which data on an actual PDSCH is transmitted. When the same physical antenna structure is used, an antenna port through which the CRS is transmitted corresponds to an antenna port through which a CSI-RS is transmitted according to an antenna virtualization scheme and an antenna port through which the DM-RS (i.e. UE-RS) is transmitted corresponds to an antenna port through the CSI-RS is transmitted according to precoding, as shown in FIG. 11. In other words, to estimate a data transport channel from a CRS transport channel estimated using the CRS, the UE may be aware of information about a precoding matrix and an antenna virtualization matrix, i.e. a difference between the CRS transport channel and the data transport channel. Accordingly, to demodulate CRS-based unicast data, the information about the antenna virtualization matrix and the precoding matrix may be transmitted to the UE.

In an exemplary embodiment of the present invention, a method is proposed for restricting a precoding matrix, transmitted through a feedback channel by a UE in order to share information about precoding, to be used in an eNB without additional change or for transmitting information about the precoding matrix to the UE. In addition, a method is proposed for transmitting information about a selected pattern to the UE through a higher layer signal, after applying a prescheduled fixed antenna virtualization matrix or restricting the antenna virtualization matrix to a specific pattern.

Figure 12A:
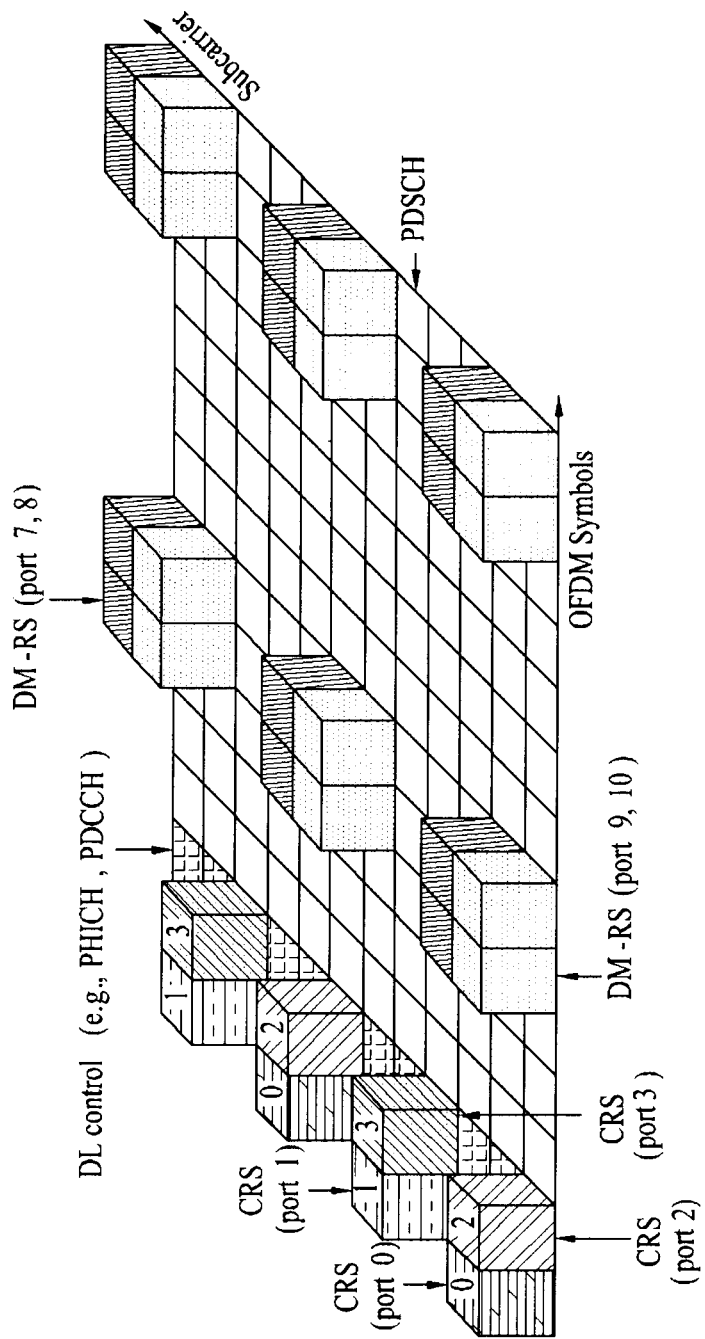
FIGS. 12A and 12B show a transmission power allocation method of an RS transmitted in an MBSFN subframe according to an exemplary embodiment of the present invention.
Figure 12B:
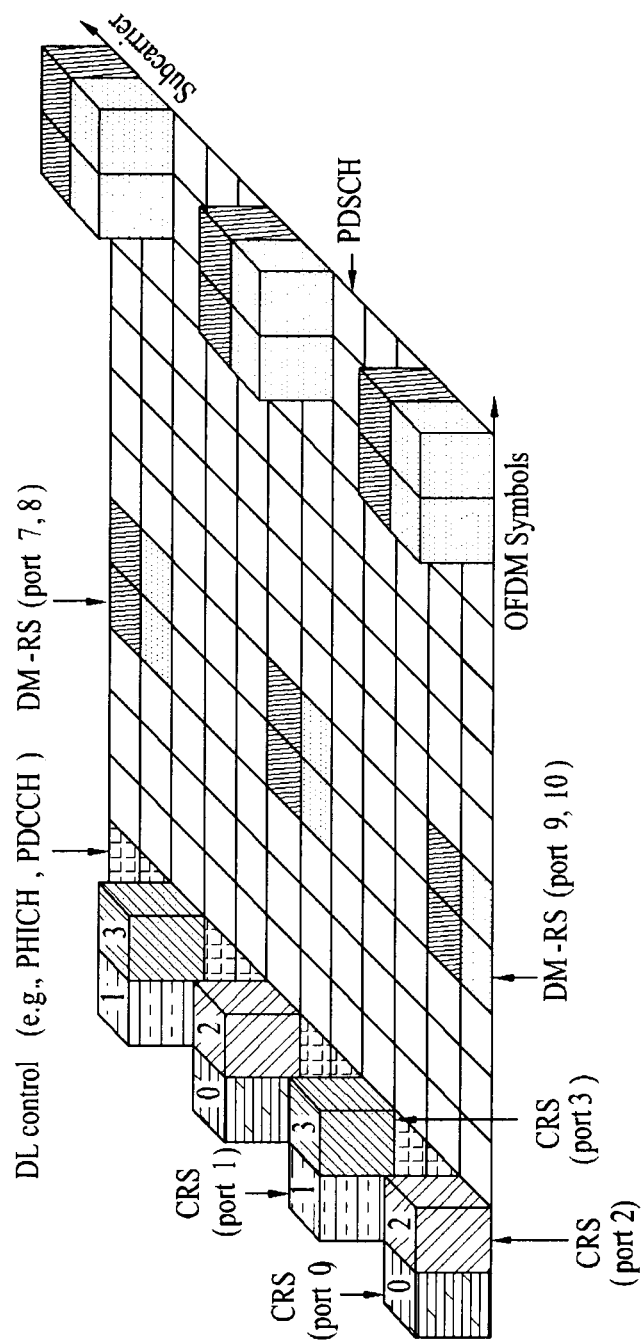

FIGS. 12A and 12B show a transmission power allocation method of an RS transmitted in an MBSFN subframe according to an exemplary embodiment of the present invention. Although an UE-RS of the LTE-A system may be transmitted at a higher transmission power by 3 dB than a transmission power of a PDSCH when the number of spatial layers is 3 or more in transmission mode 9, the UE-RS may be restricted to be transmitted at the same power as the transmission power of the PDSCH in the other cases. Moreover, although the CSI-RS has a power gain of −8 dB to 15 dB relative to the PDSCH, the range of the power gain is limited due to out-of-band emission restrictions (e.g. 6 dB or less).

However, since an r-ABS has a reduced entire transmission power therein, the above transmission power restrictions for the RS may be somewhat relieved. Accordingly, a relatively high transmission power gain for the RS may be set as opposed to legacy subframes according to necessity for improvements on channel estimation and data demodulation performance. The present invention proposes a method for subframe-specifically allocating a transmission power of the RS in consideration of a specific case such as the r-ABS. Information about the transmission power for a subframe-specific RS may be transmitted to a UE through a higher layer signal.

For example, according to necessity, the UE-RS in the MBSFN subframe may have a power gain of 3 dB to 6 dB relative to a transmission power of the PDSCH and the CRS-RS may have a power gain of 1 dB to 3 dB relative to a transmission power of the PDSCH. The transmission powers of the UE-RS or CSI-RS may be determined based on the transmission power of the CRS transmitted in the control region of the MBSFN subframe. In other words, the transmission power of the UE-RS and the transmission power of the CSI-RS may be individually determined based on the transmission power of the CRS and variable ranges of the respective transmission powers may be the same or different or may overlap.

Detailed examples of the above embodiment are shown in FIGS. 12A and 12B. According to the above embodiment, a method is proposed for totally or partially raising transmission powers of RSs except for a CRS transmitted in the control region of the MBSFN subframe, when the MBSFN subframe in which a downlink signal is transmitted is configured as the r-ABS. FIG. 12A shows an example of raising transmission powers of OFDM symbols for all RSs in an MBSFN region of the MBSFN subframe in comparison with FIG. 10A. FIG. 12B shows an example of raising transmission powers of OFDM symbols for partial RSs in the MBSFN region of the MBSFN subframe in comparison with FIG. 10A.

When CRS-based data demodulation is performed in FIG. 10A or 10B, performance enhancement according to a power gain of the CRS may be valid only in an MBSFN region near to time-frequency resources to which the CRS is allocated. Accordingly, in this embodiment, transmission powers of RSs except for the CRS may be totally or partially set to be high in terms of an antenna port or an OFDM symbol. In this case, information as to in which antenna port or OFDM symbol the transmission power of the RS will be increased and information about the magnitude of the power gain may be transmitted to the UE through a higher layer signal for each of subframes. As illustrated in FIG. 12A or 12B, the transmission power of the UE-RS transmitted in the data region (or MBSFN region) of the MBSFN subframe may be set to be higher than a reduced transmission power set for the r-ABS. Therefore, the UE receiving the power-raised RS can use the UE-RS as well as the above-described CRS for demodulation of downlink signal.

As an additional operation according to an exemplary embodiment of the present invention, a transmission mode for allocating a CRS to a unicast data transmission region in an MBSFN subframe in which unicast data is transmitted is proposed. In the MBSFN subframe in which the unicast data is transmitted in a current LTE system, a data region in which the unicast data is transmitted is configured such that a UE-RS such as a DM-RS etc. and an LTE-A supportable RS such as a CSI-RS etc. may be allocated. However, in some cases, it may be more favorable to demodulate the unicast data in the MBSFN subframe based on the CRS rather than the DM-RS. For example, since an RS supporting legacy LTE UEs, such as the CRS, in an MBSFN subframe configured as an r-ABS is transmitted without reducing a transmission power thereof, the RS has a high transmission power relative to a transmission power in the data region in which the unicast data is transmitted. Accordingly, the present invention proposes an additional transmission mode supporting unicast data demodulation based on the CRS in the MBSFN subframe.

In the case in which CRS-based unicast data demodulation is supported in the MBSFN subframe according to an exemplary embodiment, a method for differentially setting transmission powers of a CRS in a control region of the MBSFN subframe and a CRS in a data region of the MBSFN subframe is described. Generally, an r-ABS may be configured for ICIC in a multi-cell environment of an LTE system. In the r-ABS, the transmission power of unicast data may be reduced but the transmission powers of signals for legacy LTE UEs, such as a CRS, which are unable to recognize the r-ABS, may be maintained. In an MBSFN subframe supporting CRS-based unicast data demodulation, the CRS in the control region may be necessary for system information of legacy UEs, whereas the CRS in the data region is used only for unicast data transmission. In other word, the CRS in the data region is valid for only UEs supporting LTE-A. Consequently, it is desirable to reduce the transmission power of the CRS in the data region according to an ICIC scheme. Accordingly, the present invention proposes a differential transmission power setting method in which the transmission power of a CRS in a data region in an MBSFN subframe supporting CRS-based unicast data demodulation is reduced while the transmission power of a CRS in a control region of the MBSFN subframe is maintained.

Operation for performing channel interpolation through differential weight assignment when CRSs to which differential transmission powers are allocated are transmitted in an MBSFN subframe according to an exemplary embodiment of the present invention will now be described. In the case where CRSs to which differential transmission powers are allocated are transmitted in the MBSFN subframe, different weights need to be assigned to the CRSs. For example, noise and interference during channel estimation appears to be relatively weak in a CRS having a higher transmission power and, therefore, it is desirable to assign a higher weight to the CRS having a higher transmission power during channel interpolation. Accordingly, channel interpolation can be performed by assigning differential weights to the CRS in the control region and the CRS in the data region during demodulation for the unicast data region.

Figure 13:
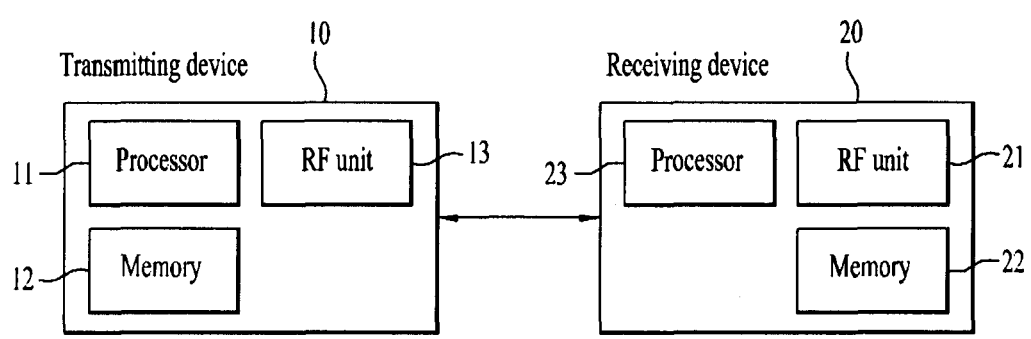
FIG. 13 is a block diagram of an apparatus for implementing exemplary embodiments of the present invention.

FIG. 13 is a block diagram of an apparatus configured to implement exemplary embodiments of the present invention.

A transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to perform the present invention. The processors 11 and 21 may be called controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device is the reverse of the signal processing process of the transmitting device 10. Under the control of the processor 21, the RF unit 23 of the receiving device 10 receives radio signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single radio channel from one physical antenna or a composite channel from a plurality of physical antenna elements including the antenna. That is, an antenna is defined such that a channel transmitting a symbol on the antenna may be derived from the channel transmitting another symbol on the same antennaAn RF unit supporting a MIMO function of transmitting and receiving data using a plurality of antennas may be connected to two or more antennas.

In the exemplary embodiments of the present invention, a UE or relay operates as the transmitting device 10 on uplink and as the receiving device 20 on downlink. In the exemplary embodiments of the present invention, a BS operates as the receiving device 20 on uplink and as the transmitting device 10 on downlink.

Hereinafter, to describe the exemplary embodiments of the present invention, a processor, a memory, and an RF unit included in the BS will be referred to as a BS processor, a BS memory, and a BS RF unit, respectively. Further, a processor, a memory, and an RF unit included in the UE will be referred to as a UE processor, a UE memory, and a UE RF unit, respectively. In the present invention, the BS processor may be a processor located in the BS or may be a BS controller connected to a cable or a dedicated line with the BS to control the BS.

The UE may be configured to receive a downlink signal in an MBSFN subframe from the BS. The UE processor may be configured to receive information indicating the MBSFN subframe configured as the ABS through the UE RF unit and demodulate the downlink signal received in a data region of the MBSFN subframe based on a CRS in a control region of the MBSFN subframe. Generally, in an LTE-A system, a UE-RS (or DM-RS) is used to demodulate the downlink signal. However, in the case of a subframe in which a transmission power in a data region of an ABS or r-ABS is allocated as a reduced power $P_{ABS}$ lower than a transmission power in a data region of a normal subframe, a transmission power of the UE-RS is also allocated as a reduced power and thus performance degradation may occur when the UE-RS having the reduced power is used for downlink signal demodulation. Accordingly, the BS processor may provide information indicating the MBSFN subframe configured as the r-ABS to the UE and the information may be transmitted to the UE through higher layer signaling.

Upon receiving the information, the UE may demodulate the downlink signal based on the CRS through the UE processor.

Meanwhile, a channel on which the CRS is transmitted may be different from a channel on which the downlink signal to be demodulated is transmitted. Hence, the UE processor may receive information about an antenna virtualization matrix and a precoding matrix for CRS-based downlink signal demodulation from the BS through the UE RF unit and the information may be transmitted to the UE through higher layer signaling.

If the MBSFN subframe is configured as an ABS or an r-ABS, the effect of relatively raising the CRS transmission power described with reference to FIG. 9 may be valid only for the data region near to the control region of the MBSFN subframe in which the CRS is transmitted. In other words, a channel on which OFDM symbols in the MBSFN subframe distant from the first or second OFDM symbol of the MBSFN subframe in which the CRS is transmitted may be different from a channel on which OFDM symbols near to the first or second OFDM symbol are transmitted. To compensate for this, the BS processor may allocate a higher power than the reduced power $P_{ABS}$ for the transmission power of the UE-RS transmitted in the data region of the MBSFN subframe, wherein the transmission power of the UE-RS may be individually allocated to each MBSFN subframe, each OFDM symbol in the MBSFN subframe, or each antenna port configured to transmit the UE-RS.

The UE processor may receive information about the transmission power of the UE-RS from the BS through the UE RF unit and the information may be transmitted to the UE through higher layer signaling.

Upon receiving the information about the transmission power of the UE-RS, the UE processor may demodulate the downlink signal based on the CRS and the UE-RS.

Thus, if the MBSFN subframe is configured as the ABS or r-ABS, since the CRS transmitted in the control region of the MBSFN subframe has an effect of raising the transmission power (actually, the same transmission power as a power when the ABS or r-ABS is not applied) relative to the OFDM symbols in the data region, the BS processor may support downlink signal demodulation based on the CRS with respect to the UE. Further, to improve demodulation performance, the BS processor may individually allocate a transmission power even to UE-RS transmitted in the data region of the MBSFN subframe.

The above-described detailed configuration of the transmitting device and receiving device corresponding to the BS and UE may be implemented such that items described in the various embodiments of the present invention are independently applied or two or more embodiments are simultaneously applied and repetitive parts are omitted for clarity.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for receiving a downlink signal from a base station (BS) in a multicast broadcast single frequency network (MBSFN) subframe which carries a cell-specific reference signal (CRS) in only a control region, the method performed by a user equipment (UE) and comprising:
   receiving information indicating an MBSFN subframe configured as an almost blank subframe (ABS) (ABS MBSFN subframe) of which a data region is allocated a reduced transmission power lower than a transmission power in a data region of a normal subframe, among MBSFN subframes;
   receiving information for matching between a channel through which the CRS is received and a channel through which the downlink signal is received in the data region of the ABS MBSFN subframe; and
   demodulating the downlink signal using the CRS received in the control region of the ABS MBSFN subframe according to the information indicating the ABS MBSFN subframe.

2. The method according to claim 1, wherein the information indicating the ABS MBSFN subframe is received from the BS through higher layer signaling.

3. The method according to claim 1, wherein the information for matching includes information about an antenna virtualization matrix and a precoding matrix for demodulation of the downlink signal using the CRS.

4. The method according to claim 1, further comprising:
   receiving a UE-specific reference signal (RS) to which a higher transmission power than the reduced transmission power is allocated, in the data region of the ABS MBSFN subframe,
   wherein a transmission power of the UE-specific RS is individually allocated to each MBSFN subframe, each OFDM symbol in the MBSFN subframe, or each antenna port configured to transmit the UE-specific RS, and
   wherein both the UE-specific RS and the CRS received in the control region of the ABS MBSFN subframe are used for demodulation of the downlink signal.

5. The method according to claim 4, further comprising receiving information about the transmission power of the UE-specific RS from the BS.

6. The method according to claim 5, wherein the information about the transmission power of the UE-specific RS is received from the BS through higher layer signaling.

7. A method for transmitting a downlink signal to a user equipment (UE) in a multicast broadcast single frequency network (MBSFN) subframe which carries a cell-specific reference signal (CRS) in only a control region, the method performed by a base station (BS) and comprising:
   configuring at least one of MBSFN subframes as an almost blank subframe (ABS) of which a data region is allocated a reduced transmission power lower than a transmission power in a data region of a normal subframe,
   transmitting information indicating the MBSFN subframe configured as the ABS (ABS MBSFN subframe) to the UE, and
   receiving information for matching between a channel through which the CRS is received and a channel through which the downlink signal is received in the data region of the ABS MBSFN subframe,
   wherein the information indicating the ABS MBSFN subframe allows the UE to demodulate the downlink signal by using the CRS received in the control region of the ABS MBSFN subframe.

8. The method according to claim 7, wherein the information indicating the ABS MBSFN subframe is transmitted to the UE through higher layer signaling.

9. The method according to claim 7, wherein the information for matching includes information about an antenna virtualization matrix and a precoding matrix for demodulation of the downlink signal using the CRS.

10. The method according to claim 7, further comprising:
    allocating a higher power than the reduced transmission power to a UE-specific reference signal (RS) transmitted in the data region of the ABS MBSFN subframe,
    wherein the transmission power of the UE-specific RS is individually allocated to each MBSFN subframe, each OFDM symbol in the MBSFN subframe, or each antenna configured to transmit the UE-specific RS; and
    transmitting information about the transmission power of the UE-specific RS to the UE.

11. A user equipment (UE) configured to receive a downlink signal from a base station (BS) in a multicast broadcast single frequency network (MBSFN) subframe which carries a cell-specific reference signal (CRS) in only a control region, comprising:
    a Radio Frequency (RF) unit configured to transmit or receive an RF signal; and
    a processor configured to control the RF unit,
    wherein the processor is configured to:
    receive information indicating an MBSFN subframe configured as an almost blank subframe (ABS) (ABS MBSFN subframe) of which a data region is allocated a reduced transmission power lower than a transmission power in a data region of a normal subframe, among MBSFN subframes through the RF unit;
    receive information for matching between a channel through which the CRS is received and a channel through which the downlink signal is received in the data region of the ABS MBSFN subframe; and
    demodulate the downlink signal using the CRS received in a control region of the ABS MBSFN subframe according to the information indicating the ABS MBSFN subframe.

12. The UE according to claim 11, wherein the information indicating the ABS MBSFN subframe is received from the BS through higher layer signaling.

13. The UE according to claim 11, wherein the information for matching includes information about an antenna virtualization matrix and a precoding matrix for demodulation of the downlink signal using the CRS, from the BS.

14. The UE according to claim 11,
    wherein the processor is configured to receive, through the RF unit, a UE-specific reference signal (RS) to which a higher transmission power than the reduced transmission power is allocated, in the data region of the ABS MBSFN subframe,
    wherein a transmission power of the UE-specific RS is individually allocated to each MBSFN subframe, each OFDM symbol in the MBSFN subframe, or each antenna configured to transmit the UE-specific RS, and wherein both the UE-specific RS and the CRS received in the control region of the ABS MBSFN subframe are used for demodulation of the downlink signal.

15. The UE according to claim 14, wherein the processor is configured to receive, through the RF unit, information about the transmission power of the UE-specific RS from the BS.

16. The UE according to claim 15, wherein the information about the transmission power of the UE-specific RS is received from the BS through higher layer signaling.

17. A base station (BS) configured to transmit a downlink signal to a user equipment (UE) in a multicast broadcast single frequency network (MBSFN) subframe which carries a cell-specific reference signal (CRS) in only a control region, comprising:
a radio frequency (RF) unit configured to transmit and receive an RF signal; and
a processor configured to control the RF unit,
wherein the processor is configured to configure at least one of MBSFN subframes as an almost blank subframe (ABS) of which a data region is allocated a reduced transmission power lower than a transmission power in a data region of a normal subframe,
transmit information indicating the MBSFN subframe configured as the ABS (ABS MBSFN subframe) to the UE, and
transmit information for matching between a channel through which the CRS is transmitted and a channel through which the downlink signal is transmitted in the data region of the ABS MBSFN subframe;
wherein the information indicating the ABS MBSFN subframe allows the UE to demodulate the downlink signal by using the CRS in a control region of the ABS MBSFN subframe.

18. The BS according to claim 17, wherein the information indicating the ABS MBSFN subframe is transmitted to the UE through higher layer signaling.

19. The BS according to claim 17, wherein the information for matching includes information about an antenna virtualization matrix and a precoding matrix for demodulation of the downlink signal using the CRS, to the UE.

20. The BS according to claim 17, wherein the processor is configured to:
allocate a higher power than the reduced transmission power to a UE-specific reference signal (RS) transmitted in the data region of the ABS MBSFN subframe, wherein the transmission power of the UE-specific RS is individually allocated to each MBSFN subframe, each OFDM symbol in the MBSFN subframe, or each antenna configured to transmit the UE-specific RS; and
transmit information about the transmission power of the UE-specific RS to the UE through the RF unit.

* * * * *